US008144367B2

(12) United States Patent
Yamada

(10) Patent No.: US 8,144,367 B2
(45) Date of Patent: Mar. 27, 2012

(54) IMAGE FORMING APPARATUS EQUIPPED WITH A PLURALITY OF FUNCTIONS RELATING TO IMAGE FORMATION INCLUDING PRINTING COMPUTER DATA AND COPYING IMAGES

(75) Inventor: Akihiro Yamada, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1236 days.

(21) Appl. No.: 11/463,790

(22) Filed: Aug. 10, 2006

(65) Prior Publication Data
US 2007/0047015 A1 Mar. 1, 2007

(30) Foreign Application Priority Data

Aug. 26, 2005 (JP) .................................. 2005-246131

(51) Int. Cl.
G06K 15/00 (2006.01)
H04N 1/40 (2006.01)
H04N 1/00 (2006.01)

(52) U.S. Cl. ........ 358/3.24; 358/1.16; 358/401; 358/448

(58) Field of Classification Search ................. 358/1.13, 358/1.16, 401, 444, 468, 296, 404, 442, 501, 358/502, 574, 3.24, 523, 448; 347/111, 128, 347/221, 3; 399/361
See application file for complete search history.

(56) References Cited

U.S. PATENT DOCUMENTS

| 5,854,693 | A | 12/1998 | Yoshiura et al. | |
|---|---|---|---|---|
| 6,259,534 | B1 | 7/2001 | Akiyama | |
| 6,570,667 | B1 * | 5/2003 | Hattori et al. | 358/1.15 |
| 2002/0030853 | A1 * | 3/2002 | Kizaki et al. | 358/1.16 |
| 2006/0039609 | A1 * | 2/2006 | Takano | 382/190 |

FOREIGN PATENT DOCUMENTS

| JP | H7 96637 | 4/1995 |
|---|---|---|
| JP | H7 175916 | 7/1995 |
| JP | H8 123397 | 5/1996 |
| JP | H09-247399 A | 9/1997 |
| JP | H11 205524 | 7/1999 |
| JP | 2000 263859 | 9/2000 |
| JP | 2000-341488 A | 12/2000 |
| JP | 2002-103701 A | 4/2002 |
| JP | 2003 8797 | 1/2003 |
| JP | 2004 312242 | 11/2004 |
| JP | 2005-079679 A | 3/2005 |
| WO | WO 2005/086470 | * 9/2005 |

OTHER PUBLICATIONS

Japan Patent Office; Notice of Reasons for Refusal in Japanese Patent Application No. 2005-246131 (counterpart to the above-captioned U.S. patent application) mailed Feb. 16, 2010.

* cited by examiner

Primary Examiner — Benny Tieu
Assistant Examiner — Ngon Nguyen
(74) Attorney, Agent, or Firm — Baker Botts L.L.P.

(57) ABSTRACT

The present invention includes an image forming apparatus having an image forming portion that forms an image on a based on supplied image data, that can selectively execute a plurality of functions, and further comprises a storage device having a shared area for commonly storing information when executing any function among the plurality of functions, wherein when information that is due to be written in a shared area of the storage device based on an execution command of one function is already written in an area that is reserved for another function, the apparatus outputs a selection request relating to execution of the one function, and restricts utilization of the storage device with respect to a shared area for executing the one function in accordance with the selection result.

12 Claims, 10 Drawing Sheets

IMAGE FORMING APPARATUS EQUIPPED WITH A PLURALITY OF FUNCTIONS RELATING TO IMAGE FORMATION INCLUDING PRINTING COMPUTER DATA AND COPYING IMAGES

CROSS REFERENCE TO RELATED APPLICATION

This application claims priority from Japanese Patent Application No. 2005-246131 filed Aug. 26, 2005. The entire content of these priority application is incorporated herein by reference.

TECHNICAL FIELD

The present invention relates to an image forming apparatus equipped with a plurality of functions relating to image formation, such as printing computer data and copying images.

BACKGROUND

In recent years, image forming apparatuses are being-provided that can execute a plurality of functions relating to image formation, such as sending and receiving facsimile communications, printing computer data and copying papers. In this kind of image forming apparatus, i.e. a multifunction apparatus, the control circuit does not use dedicated memories for the functions, but rather, in order to reduce the number of component parts and the like, is equipped with a memory having a shared area that is shared for the plurality of functions, and the control circuit uses this shared memory commonly. The shared area of the memory is commonly utilized for executing each function when the multifunction apparatus selectively executes the plurality of functions.

Some multifunctional apparatuses include a configuration in which, in a state where one function (for example, a function that prints computer data) is selected among a plurality of functions, when an execution command is received for another function (for example, a copy function) the control circuit releases the shared area of the memory that is being used to print computer data and uses that shared area for the copy function that was newly selected.

However, according to the above described configuration, when an execution command is received for one function (such as a copy function), the subsequent processing is executed uniformly without the intervention of a user decision. Therefore, data that is stored in the shared memory for another function that was already selected (such as a computer data printing function) is overwritten or discarded against the user's intention. There is thus a problem that execution of another function is stopped against the user's intention.

In view of the problems identified above, there is a need in the art for an image forming apparatus that enables execution of functions and utilization of a shared area in accordance with a user decision.

SUMMARY

According to the present invention there is provided an image forming apparatus including an image forming portion that forms an image on a recording medium based on supplied image data, that can selectively execute a plurality of functions, and further comprises a storage device having a shared area for commonly storing information when executing any function among the plurality of functions, wherein when information that is due to be written in a shared area of the storage device based on an execution command of one function is already written in an area that is reserved for another function, the apparatus outputs a selection request relating to execution of the one function to cause a user to input a selection result for the selection request, and restricts utilization of the storage device with respect to a shared area for executing the one function in accordance with the selection result.

Since it is therefore possible to prevent overwriting or discarding or the like of data being carried out in a shared area against the intention of a user, utilization of the shared area and execution of a plurality of functions in accordance with a user decision is enabled.

DETAILED DESCRIPTION

The present invention will now be described with reference to FIGS. 1 to 9.

Figure 1:
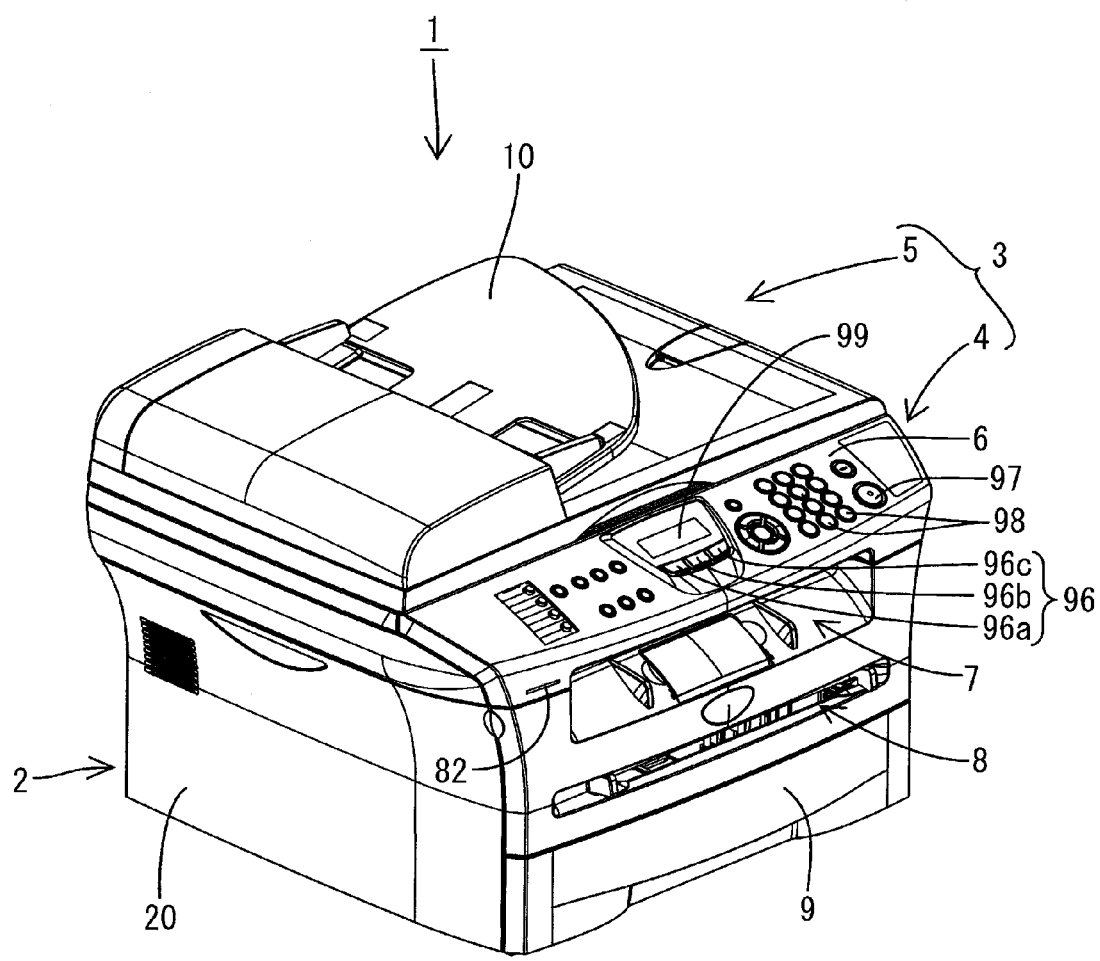
FIG. 1 is an oblique perspective view that shows the external appearance of a multifunction apparatus according to an embodiment of this invention.
Figure 2:
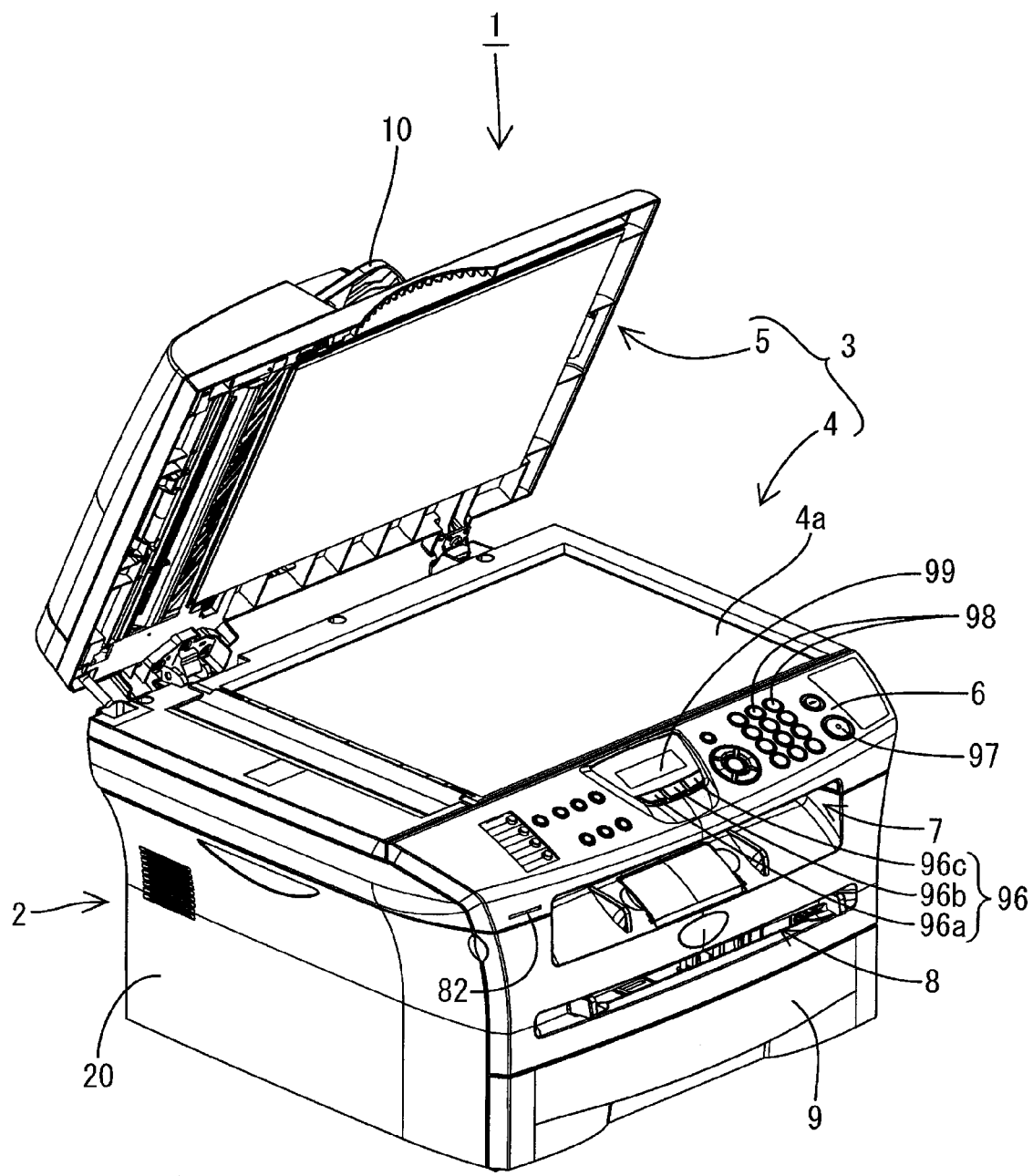
FIG. 2 is an oblique perspective view of the multifunction apparatus shown in FIG. 1 that shows a state in which a scanner unit is open.
Figure 3:
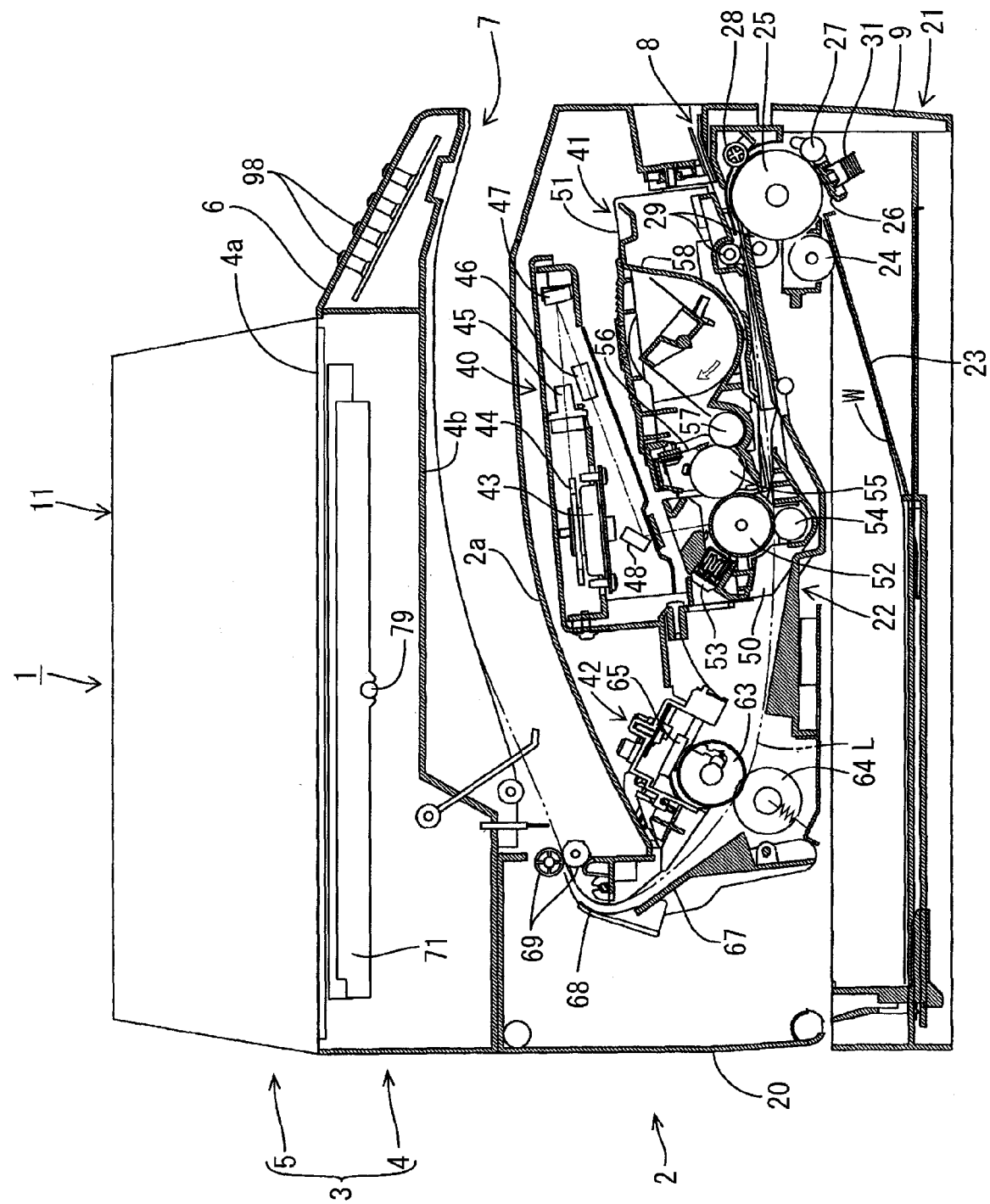
FIG. 3 is a side sectional view showing a schematic configuration of the multifunction apparatus shown in FIG. 1.

The image forming apparatus according to the present invention is a multifunction apparatus 1 that is equipped with numerous functions including, but not limited to, a printer function, a scanner function, a copy function, facsimile transmission/reception function and the like. FIG. 1 is an oblique perspective view that shows the external appearance of the multifunction apparatus 1. FIG. 2 is an oblique perspective view of the multifunction apparatus 1 showing a state in which a scanner unit is open. FIG. 3 is a side sectional view showing a schematic configuration of the multifunction apparatus 1.

As shown in FIG. 3, the multifunction apparatus 1 includes an image forming unit 2 that includes a feeder portion 21 and an image forming portion 22 and the like, and an automatic conveyance original scanner unit (hereunder, referred to as "scanner unit 3"). The scanner unit 3 comprises an image scanning device 4 which is provided with a rectangular original plate 4a on the top surface thereof, and an automatic document feeder (hereunder, referred to as "ADF 5") that is disposed so as to cover the original plate 4a.

At one end side of the image scanning device 4 (in FIG. 1, in the lower right direction on the page) is provided an operating part 6 that allows a user to perform various operations.

The operating part 6 consists of mode selection switches 96, a start key 97, various operation buttons 98 and a liquid crystal display touch panel 99.

The mode selection switches 96 comprise the following three mode keys that are disposed side-by-side from left to right: a copy mode key 96a for selecting a copy mode, a FAX mode key 96b for selecting a FAX (facsimile) mode, and a scanner mode key 96c for selecting a scanner mode. The mode selection switches 96 can selectively activate the functions of these keys. A printer function that prints data from a computer is automatically activated by print data being sent from a computer.

The start key 97 is a switch for starting operations in the activated mode. When the start key 97 is pressed (turned on) in copy mode, copying of an item placed on the original plate 4a starts. When the start key 97 is pressed in FAX mode or scanner mode, an operation to scan an item for FAX transmission or an operation to scan an item or the like is performed.

The touch panel 99 is configured to show displays relating to various kinds of settings and, as described in detail later, the user can make various settings by performing predetermined operations on the touch panel 99.

A sheet discharge opening 7 that opens to extend to a discharge tray 2a is formed in a position below the operating part 6. On the underside of the sheet discharge opening 7 is formed a manual-sheet feed opening 8 that extends in a horizontal direction and opens in slit shape. On the underside of the manual-sheet feed opening 8 is provided a sheet supply cassette 9. The sheet supply cassette 9 can be removed in a detachable/attachable manner from the same side as the side on which the operating part 6 and the like are disposed.

In the description below, with respect to the multifunction apparatus 1, the side on which the operating part 6 is provided (in FIG. 1, the lower right side on the page) is referred to as the "front", and the opposite side thereto (in FIG. 1, the upper left side on the page) is referred to as the "rear".

FIG. 2 is an oblique perspective view of the multifunction apparatus 1 that shows a state in which the scanner unit 3 is open. As shown in FIG. 2, in the scanner unit 3, the rear end part on the side opposite to the above described operating part 6 is pivoted in a rotatable condition at the rear end side of the top surface of the image forming unit 2.

The various components of the image forming unit 2 will now be described with reference to FIG. 3. FIG. 3 is a side sectional view that shows the substantial parts of the multifunction apparatus 1 as viewed from the axial direction of a sheet feeding roller 25 and the like. In the figure, the front of the multifunction apparatus 1 is on the right side on the page, and the rear of the multifunction apparatus 1 is on the left side on the page.

Within a casing 20 of the image forming unit 2 are provided a feeder portion 21 for feeding a sheet W, and an image forming portion 22 for forming a predetermined image on the fed sheet W. On the top part of the image forming portion 22 is provided a discharge tray 2a that is used for receiving a sheet W that was discharged after an image was formed thereon by the image forming portion 22.

The feeder portion 21 comprises the sheet supply cassette 9, a sheet pressing plate 23 provided within the sheet supply cassette 9, a delivery roller 24 provided on the front end of the sheet supply cassette 9, a sheet feeding roller 25, a separation pad 26, an opposing roller 27 that faces the sheet feeding roller 25, a paper powder removal roller 28, and registration rollers 29 that are provided on the downstream side of the paper powder removal roller 28 in the conveying direction of the sheet W.

The sheet supply cassette 9 is detachably mounted in the bottom part in the casing 20, and is used for stacking and storing sheets W therein.

The sheet pressing plate 23 is configured such that the rear end, opposite from the sheet feeding roller 25 is supported in a rockable state, and the front end that is adjacent the sheet feeding roller 25 is movable in the vertical direction and is urged upward by an unshown spring.

The delivery roller 24 is provided so as to contact a sheet W that is stacked at the uppermost position within the sheet supply cassette 9 by means of the sheet pressing plate 23, and the sheet W is fed to a conveyable position (position between the sheet feeding roller 25 and the separation pad 26) by the sheet feeding roller 25.

The separation pad 26 is disposed at a position facing the sheet feeding roller 25. The separation pad 26 is pressed towards the sheet feeding roller 25 by a spring 31 that is provided at the back of the separation pad 26. The separation pad 26 includes a function for preventing a plurality of sheets W being fed into the conveyance path (indicated by a chain double-dashed line L in FIG. 3) in an overlapping state.

The sheet W is fed to the registration rollers 29 after paper powder was removed therefrom by the paper powder removal roller 28 while being turned 180 degrees by the sheet feeding roller 25.

The registration rollers 29 consist of a pair of rollers, and driving and stopping operations thereof are controlled by a control apparatus (not shown) based on a detection timing from a position sensor (not shown) that is disposed in the vicinity of the sheet feeding roller 25. Skewing of the sheet W is corrected by this control.

The image forming portion 22 comprises a scanner unit 40, a process unit 41 and a fixing unit 42 and the like.

As shown in FIG. 3, the scanner unit 40 is provided at an upper part of the casing 20, and includes a laser emission part (not shown), a polygon mirror 44 that is rotatably driven by a polygon motor 43, lenses 45 and 46, and reflecting mirrors 47 and 48. A laser beam that is emitted from the laser emission part on the basis of predetermined image data passes through or is reflected by the polygon mirror 44, the lens 45, the reflecting mirror 47, the lens 46 and the reflecting mirror 48 in that order, and is irradiated onto the surface of a photosensitive drum 52 of the process unit 41, described below, by high speed scanning.

The multifunction apparatus 1 includes a process unit 41 that is detachable from the main body of the image forming unit 2.

The process unit 41 is constituted by a drum cartridge 50 and a development cartridge 51.

In the process unit 41, the drum cartridge 50 comprises a photosensitive drum 52, a scorotron charging device 53 and a transfer roller 54. The development cartridge 51 includes a developing roller 55, a layer thickness regulating blade 56 that is pressed into contact with the top of the developing roller 55, a toner supply roller 57, and a toner box 58 that is filled with toner (developing agent).

The photosensitive drum 52 is disposed in a rotatable condition in the clockwise direction at a lateral position with respect to the developing roller 55, in a state in which it faces the developing roller 55.

The scorotron charging device 53 is a scorotron-type charging device for a positive charge, and it is spaced from the photosensitive drum 52 by a specified interval so as not to come in contact therewith.

Accompanying rotation of the photosensitive drum 52, the surface of the photosensitive drum 52 is first uniformly and positively charged by the scorotron charging device 53, and thereafter the surface is exposed by high speed scanning of a laser beam from the scanner unit 40 to form a latent image thereon on the basis of predetermined image data.

Subsequently, when toner that is carried on the developing roller 55 and positively charged faces and comes in contact with the photosensitive drum 52 by the rotation of the developing roller 55, the toner is supplied to the electrostatic latent image formed on the surface of the photosensitive drum 52. As a result, a visible image formed by toner is borne on the surface of the photosensitive drum 52, more specifically, the image is developed.

The transfer roller 54 is disposed below the photosensitive drum 52 so as to face the photosensitive drum 52, and is supported so that it can rotate in an anticlockwise direction by the drum cartridge 50. The visible image that is borne on the surface of the photosensitive drum 52 is transferred onto the sheet W while the sheet W passes between the photosensitive drum 52 and the transfer roller 54.

The fixing unit 42 is disposed further downstream in the sheet conveying direction (rear side) than the process unit 41. The fixing unit 42 includes a heat roller 63 for heating and melting the toner that was transferred onto the sheet, a pressure roller 64 that is disposed facing the heat roller 63 and presses a fed sheet towards the heat roller 63, and a thermostat 65.

The heat roller 63 is an element that incorporates a halogen lamp along the axial direction inside a cylindrical metallic tube.

The pressure roller 64 is an element in which the circumference of a roller shaft made of metal is covered by a rubber material, and is resiliently pressed against the heat roller 63 by a spring.

The thermostat 65 consists of, for example, a bimetal, and it turns the power of a heater for heating the heat roller 63 on or off in response to heat that is generated from the heat roller 63 so that the heat roller 63 is not heated to an abnormally high temperature.

In this fixing unit 42, the heat roller 63 fixes the toner that was transferred onto the sheet W in the process unit 41 by heating and pressing the toner onto the sheet W while the sheet W passes between the heat roller 63 and the pressure roller 64.

Further, the heat roller 63 conveys the sheet W that underwent the image fixing as far as discharge rollers 69 via a discharge path that is formed by guide members 67 and 68. Thereafter, the discharge rollers 69 discharge the conveyed sheet W onto the discharge tray 2*a*.

The scanner unit 3 comprises the image scanning device 4 and the ADF 5. The image scanning device 4 is disposed above the discharge tray 2*a* of the image forming unit 2 such that an undersurface 4*b* thereof faces the discharge tray 2*a* to cover the discharge tray 2*a*.

The scanner unit 3 is configured as a scanner of the flat bed-type. According to this flat-bed type configuration, the original plate 4*a* is exposed when the ADF 5 opens towards the rear (see FIG. 2), and scanning can be performed in copy mode or the like in a state in which a book or other kind of original is placed on the original plate 4*a*.

In this connection, scanning of an original M can be performed by placing the original M on the original plate 4*a* or can be performed utilizing the ADF 5. When the original M is placed on the original plate 4*a* for scanning, a CIS (contact image sensor) 71 is moved along a shaft 79 that extends in the conveyance direction of the original M and also along the original plate 4*a*, and at this time scanning of the original M that was placed on the original plate 4*a* is performed one line at a time. In contrast, when utilizing the ADF 5, the CIS 71 is moved to the left end side of the original plate 4*a* and maintained in that position to perform scanning of the original M that is conveyed by the ADF 5 one line at a time.

Figure 4:
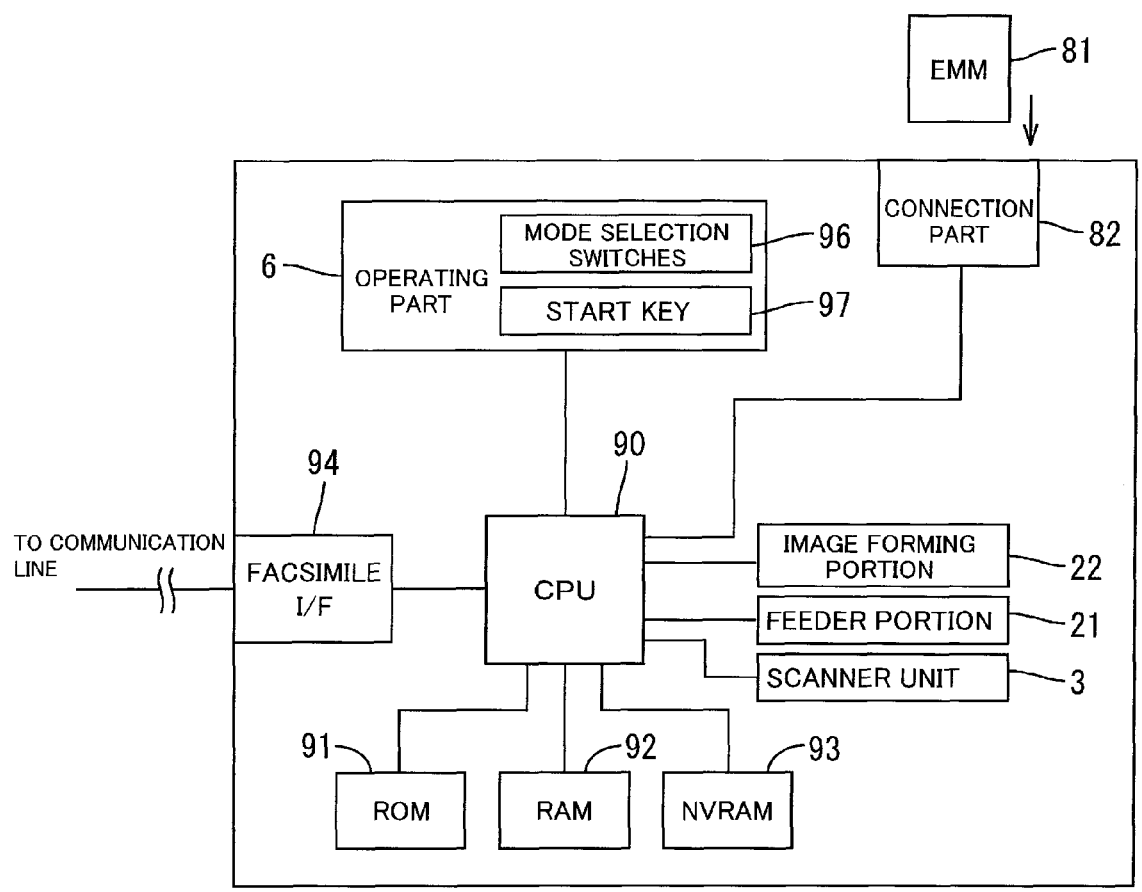
FIG. 4 is a block diagram showing the electrical configuration of the multifunction apparatus.

The electrical configuration of the multifunction apparatus 1 is illustrated in simplified form in FIG. 4.

The multifunction apparatus 1 includes the operating part 6 that accepts various kinds of input operations, the scanner unit 3 that performs scanning to generate image data, an image forming portion 22 and a feeder portion 21 for forming an image on a sheet, a CPU 90 (corresponding to "memory control device" of this invention), a ROM 91, a RAM 92 (corresponding to "storage device" of this invention), an NVRAM 93 (non-volatile memory), a facsimile I/F 94 that connects to a communication line such as a telephone line, and a connector 82 that is capable of connecting a external memory member 81 (corresponds to "external memory" of this invention).

The RAM 92 is a storage device that has a shared area for storing data necessary for executing each function when the CPU 90 executes any of the plurality of functions. The term "data necessary for executing each function" refers to, for example, for the printer function, a temporary file such as font data, macro data, or cache data for increasing the internal processing speed. For the scanner function and the copy function, the term above refers to image data that was scanned by the image scanning device 4. For the facsimile function, the term above refers to image data to be transmitted and also image data that is temporarily recorded (received in memory) when printing is not possible (i.e. when a facsimile is received because of a lack of paper in the image formation unit 2). These data are recorded in the shared area of the RAM 92 via the CPU 90.

In the NVRAM 93, count values n that indicate the usage frequency of the printer function, the scanner function, copy function and facsimile function, respectively, are stored in association with each function.

Each time the CPU 90 detects that the start key 97 has been pressed (each time it receives an operation start instruction for the respective functions), it starts (actuates) processing of the function according to the current mode in accordance with procedures stored in the ROM 91. Further, each time the processing (operation) of a function is performed, the CPU 90 increments the count for the usage frequency for that particular function (in the case of PC printing, the usage frequency of PC printing). More specifically, whenever the processing of a function is carried out, the CPU 90 increments the count value n by one. The incremented count value n corresponds to the function in question and the incremented count value n is stored in the NVRAM 93 in association with the function.

The CPU 90 then compares the value of the respective count values n for the plurality of functions, to thereby determine differences in the activity ratios of the plurality of functions.

More specifically, the function with the highest count for count value n is taken as the function with the highest activity ratio, while the function with the lowest count for count value n is taken as the function with the lowest activity ratio. It is therefore possible to perform the operation corresponding to the function with the highest activity ratio when the start key 97 is pressed when the power is turned on, thereby reducing the time and labor required to switch modes for the user. Further, when the user is selecting unwanted data when performing an operation to delete unwanted data or the like, data relating to a function with a small activity ratio, which has a high probability of being selected as an object for data deletion by the user, is displayed first, to thereby reduce the time and labor involved in deleting the data in question.

On the operating part 6, various setting can be made by touching a settings menu button (not shown) on the touch panel 99.

Figure 5A:
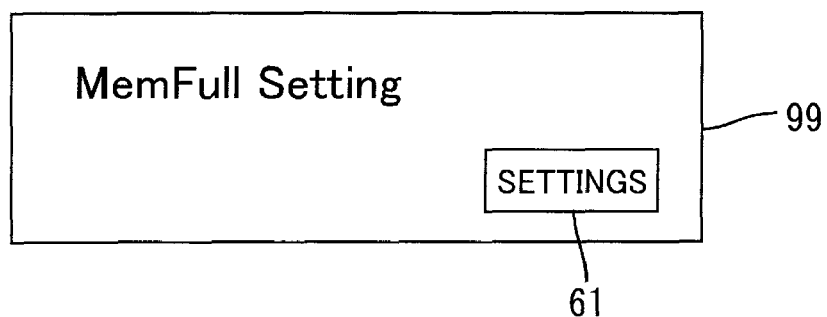
FIG. 5A through 5C are views showing touch panel displays.
Figure 5B:
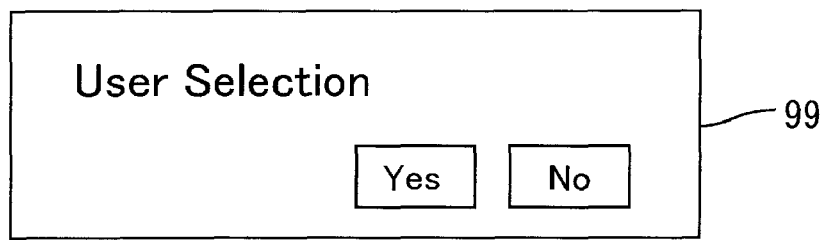

More specifically, when "MemFull Setting (settings when the memory is full)" is selected (a settings button 61 is touched; corresponds to "setting device" of this invention) on the settings menu of the touch panel 99 shown in FIG. 5A, a "User Selection" screen is displayed as shown in FIG. 5B. When the user selects "YES" on this screen, a user selection flag (=1) is set by the CPU 90 (user selection function is ON).

Figure 5C:
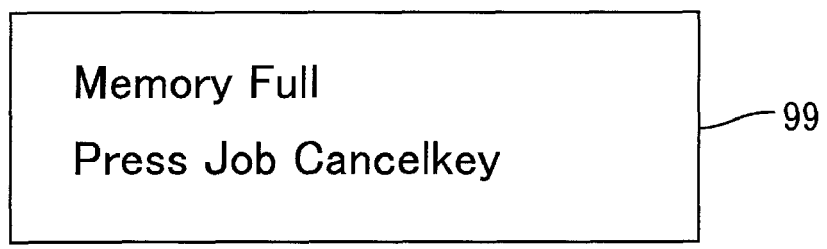

If the user selects "NO" on the "User Selection" screen, the user selection flag is cleared (=0, the user selection function is OFF). Subsequently, when there is no remaining free space in the RAM 92, as shown in FIG. 5C, a message (Memory Full; not shown) that the job in question will exceed the storage capacity of the RAM 92 and a message instructing the user to cancel the job are displayed. Thereafter, the user can cancel the processing by pressing a "job cancel" key on the operating part 6.

Figure 6A:
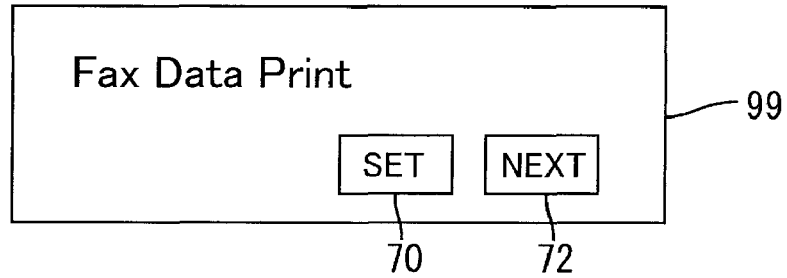
FIG. 6A through 6F are views showing displays that prompt a user selection.
Figure 6B:
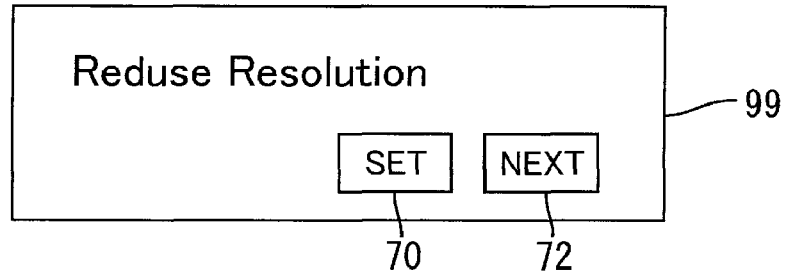
Figure 6C:
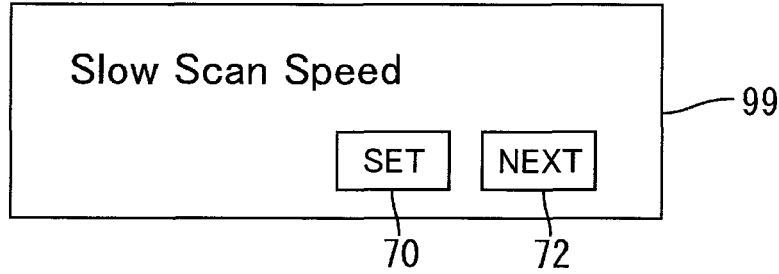
Figure 6D:
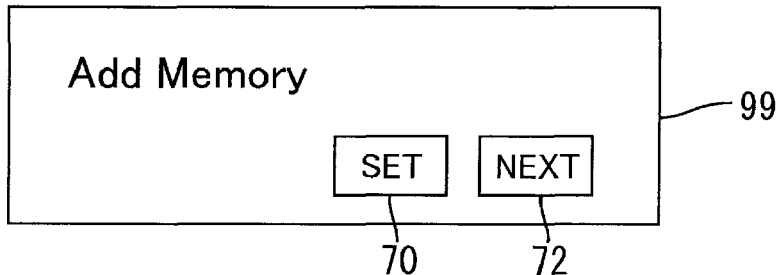
Figure 6E:
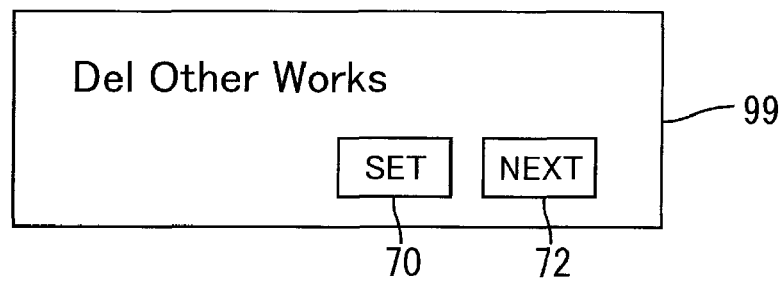

The user selection flag is a flag that is set when an action to be taken results in exceeding the storage capacity (storage capacity of shared area) of the RAM 92. When the user selection flag is set (flag is ON), if the CPU 90 detects that the free space (storage capacity of shared area) of the RAM 92 will be insufficient to store the data to be sent, the CPU 90 causes the touch panel 99 to show a display (notification) to prompt the user to make a selection, as shown in FIG. 6A. At this time, the user can select different processing by performing an operation to switch the display (by touching a switch display button 72). Accordingly, the touch panel 99 corresponds to the "notifying device" of this invention.

Figure 6F:
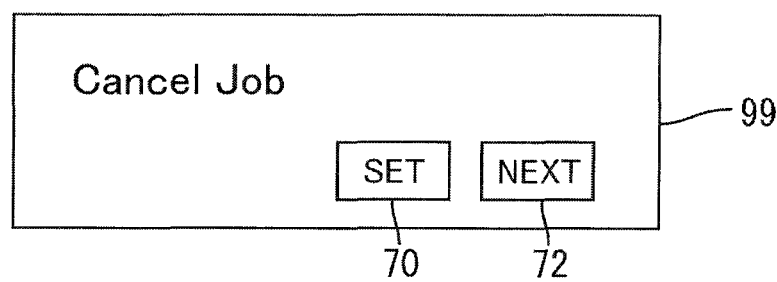
Figure 7A:
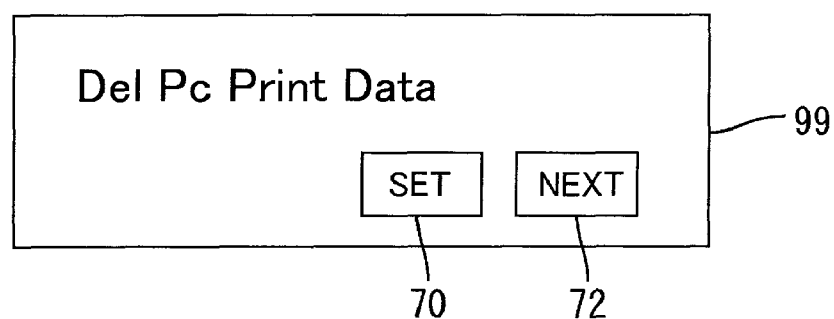
FIG. 7A through 7B are views showing data that can be deleted by a user.
Figure 7B:
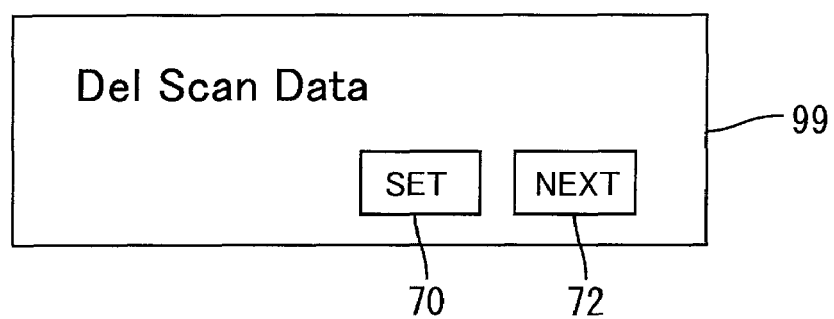

The following are examples of contents that can be displayed on the touch panel 99 and that can be selected by the user: print FAX data received in memory (FIG. 6A), reduce resolution (FIG. 6B), slow scan speed (FIG. 6C), add memory (FIG. 6D), delete data in RAM 92 (FIG. 6E), and cancel the job the user is attempting to execute (FIG. 6F). By touching the switch display button 72 on the touch panel 99 the user can switch in sequence between these displays. The CPU 90 then carries out processing or the like in accordance with the contents that were displayed when the user performed a selection operation (touched a set button 70).

Selecting print FAX data received in memory creates free space in the RAM 92 by printing data for a received FAX that is stored in the shared area of the RAM 92, and then clearing (erasing) the data. More specifically, since printing cannot be carried out when data is received at the time of an error, such as a lack of paper, the received data is temporarily stored in the RAM 92 and the amount of data that can be stored in the RAM 92 is thus reduced by that amount. In this case, the user can clear the error by replenishing the paper supply or the like and perform printing, and then deleting the received data after printing is completed. Thus, free space equal to the amount of received data that was deleted can be created in the RAM 92.

Reducing resolution is a selection that reduces data to a size that can be processed in the free space of the RAM 92 by lowering the scanning resolution in a case where, for example, the free space of the RAM 92 will be exceeded if scanning is performed at the normal resolution by the scanner unit 3.

Further, selecting the term "slow scan speed" refers to reducing the amount of image data that is supplied to the RAM 92 per unit time by making the scan buffer smaller when scanning an image. In this case, the scan buffer is a device that temporarily stores image data in order to adjust image data that is transmitted at high speed from the image scanning device 4 when, for example, executing a copy function to match printing that is performed at a comparatively low speed.

An "add memory" selection increases the storage capacity by connecting an external memory member 81. Accordingly, when the user performs the selection operation (setting) on the touch panel 99 (the touch panel 99 corresponds to "external memory setting device" of this invention), the user must also connect an external memory to the connector 82. Thus, even when handling data that exceeds the storage capacity of the RAM 92, excess data can be stored (saved) in an external memory such as the compact flash 81.

The "deletion of data" selection refers to deleting data of comparatively low importance among data stored in the shared area of the RAM 92 when data needed to perform an operation exceeds the free space of the RAM 92. Thus, new data can be stored in the shared area as a result of free space that was created.

When selecting to delete data, the user can also select which data to delete. For example, the user can select data relating to a function which the user decides there is little necessity for among the data relating to the respective functions, and delete that data. For example, when font data is stored as temporary work in order to execute the printer function, the user can select to delete that temporary work.

These kinds of deletable data are displayed in sequence on the touch panel 99 (see FIGS. 7A and 7B) to enable selection (designation) by the user. More specifically, the touch panel 99 corresponds to the "designating device" of this invention.

The order of displaying this deletable data begins with data relating to a function with a low activity ratio.

"Cancel job" is selected when the user does not want to perform processing with the designated function (data to be sent). When "cancel job" is selected, the instruction to start the function is cancelled (data to be sent is deleted), and if processing is currently underway, the current processing is cancelled.

Next, processing by the CPU 90 will be described with reference to the flowcharts of FIGS. 8 and 9.

Figure 8:
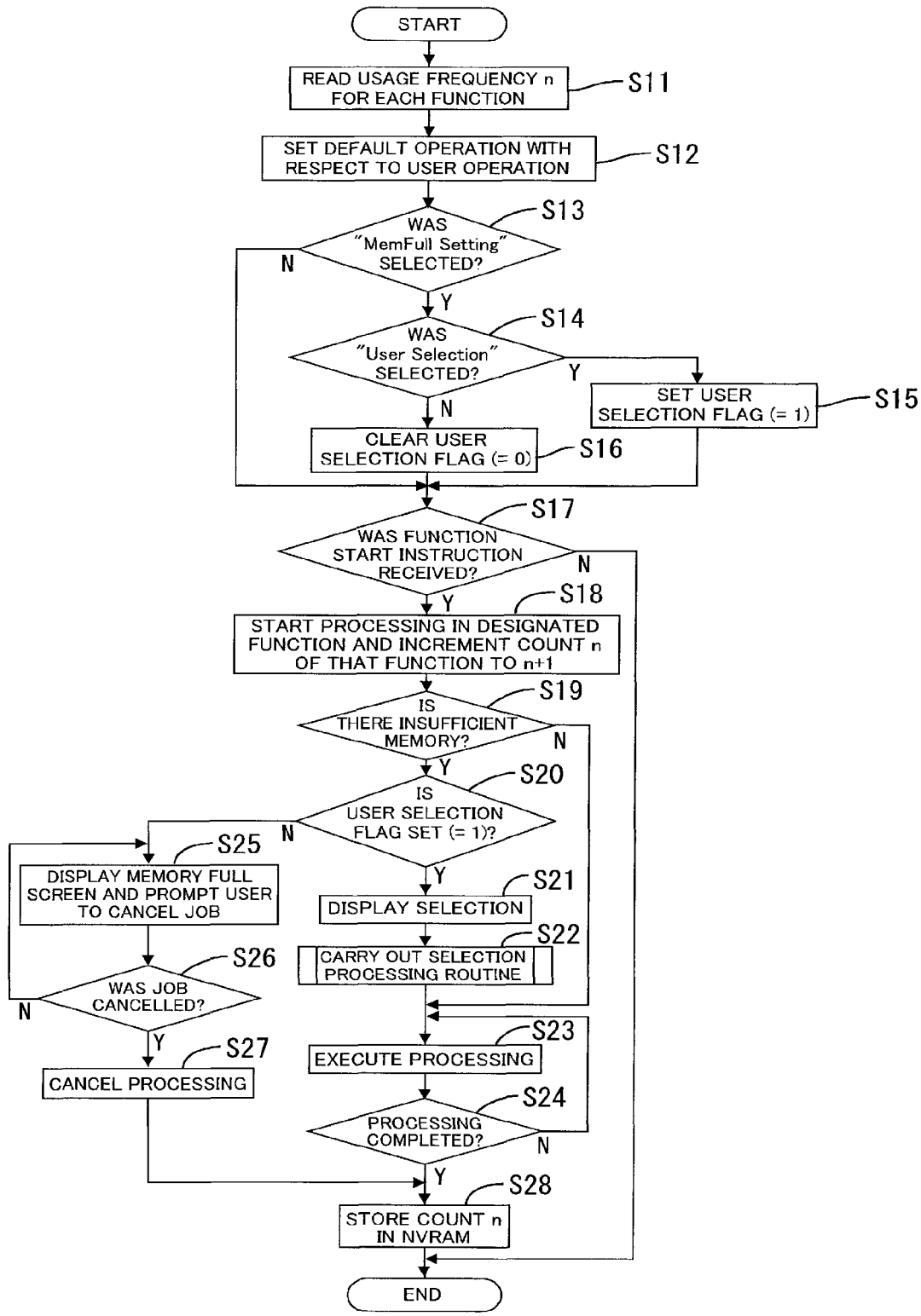
FIG. 8 is a flowchart illustrating processing performed by a CPU.

As shown in FIG. 8, when the power of the multifunction apparatus 1 is turned on, the CPU 90 reads the usage frequency count values n for each function (copy function, FAX function, and scanner function) that are stored in the NVRAM 93 (S11).

The CPU 90 then compares the respective count values n of the plurality of functions, and the default operation is set so that the function with the highest usage frequency (activity ratio) is automatically provided by selection of an operating part 6, such as the start key 97. More specifically, the operating part 6 is set to receive an operation relating to the FAX function when the usage frequency of the FAX function is highest; the operating part 6 is set to receive an operation relating to the copy function when the usage frequency of the copy function is highest; and the touch panel 99 or the like is set to receive an operation relating to the scanner function when the usage frequency of the scanner function is highest.

Next, the CPU 90 determines whether or not "MemFull Setting" is selected (S13). When "MemFull Setting" is not selected ("N" at S13), the CPU 90 determines whether or not the start key 97 was switched on (function start instruction; corresponds to "execution command of one function" of this invention) based on a signal from the operating part 6 (S17).

In contrast, when "MemFull Setting" was selected ("Y" at S13), the CPU 90 determines whether or not "User Selection" is selected (S14). When the CPU 90 determines that "User Selection" is selected ("Y" at S14), the CPU 90 sets the user selection flag (=1) (S15) and determines whether or not the start key 97 was switched on based on a signal from the operating part 6 (S17).

When the CPU 90 determines that "User Selection" was not selected ("N" at S14), it clears (initializes) the user selection flag (S16) and determines whether or not the start key 97 was switched on based on a signal from the operating part 6 (S17).

When the CPU 90 determines that the start key 97 was not switched on ("N" at S17), it ends the processing.

In contrast, when the CPU 90 determines that the start key 97 was switched on ("Y" at S17), it starts operation of the function according to the function mode set at that time, and increments by one the count value n of the function in question (S18). More specifically, when data from a PC is received when the print function is selected, the CPU 90 starts a print operation and also increments the count value n of the print function by one. Further, when the start key 97 is turned on in FAX mode, a FAX transmission is performed, when the start key 97 is turned on in copy mode, copying is performed, and when the start key 97 is turned on in scanner mode, scanning to generate image data is performed.

Subsequently, when data that was generated in accordance with the selected function is sent to the CPU 90, the CPU 90 determines whether or not the received data is of a size that can be stored in the free space of the shared area of the RAM 92 (S19). More specifically, the CPU 90 determines whether or not "a storage area (shared area) that it attempts to use for one function is a storage area reserved by another function".

When the CPU 90 determines that the received data is of a size that can be stored in the free space of the shared area of the RAM 92 ("N" in S19), the CPU 90 carries out processing for the relevant mode (image formation or the like) in that state (S23).

In contrast, when the CPU 90 determined that the received data exceeds a size that can be stored in the free space of the shared area of the RAM 92 ("Y" in S19), that is, when the total size of the received data and the data that is already stored in the RAM 92 exceeds the capacity of the shared area of the RAM 92, it determines whether or not the user selection flag (=1) is set (S20).

When the user selection flag (=1) is not set, since there is not enough free space to store the data in the RAM 92 and processing of the selected function can therefore not be executed, a message prompting the user to press the "job cancel" key in order to cancel the processing of the relevant function is displayed (S25).

When the CPU 90 detects that the job was cancelled ("Y" at S26), the CPU 90 cancels the processing (image formation or the like) of the relevant function (S27). Thereafter, the CPU 90 stores the current count value n in the NVRAM 93 and ends the processing (S28).

In contrast, when the user selection flag (=1) is currently set ("Y" at S20), the CPU 90 causes the touch panel 99 to show a display that allows the user to select the processing to be performed (here, for example, initially a display for selecting whether or not to print FAX data received in memory is displayed (S21)), and carries out a selection processing routine (S22).

Figure 9:
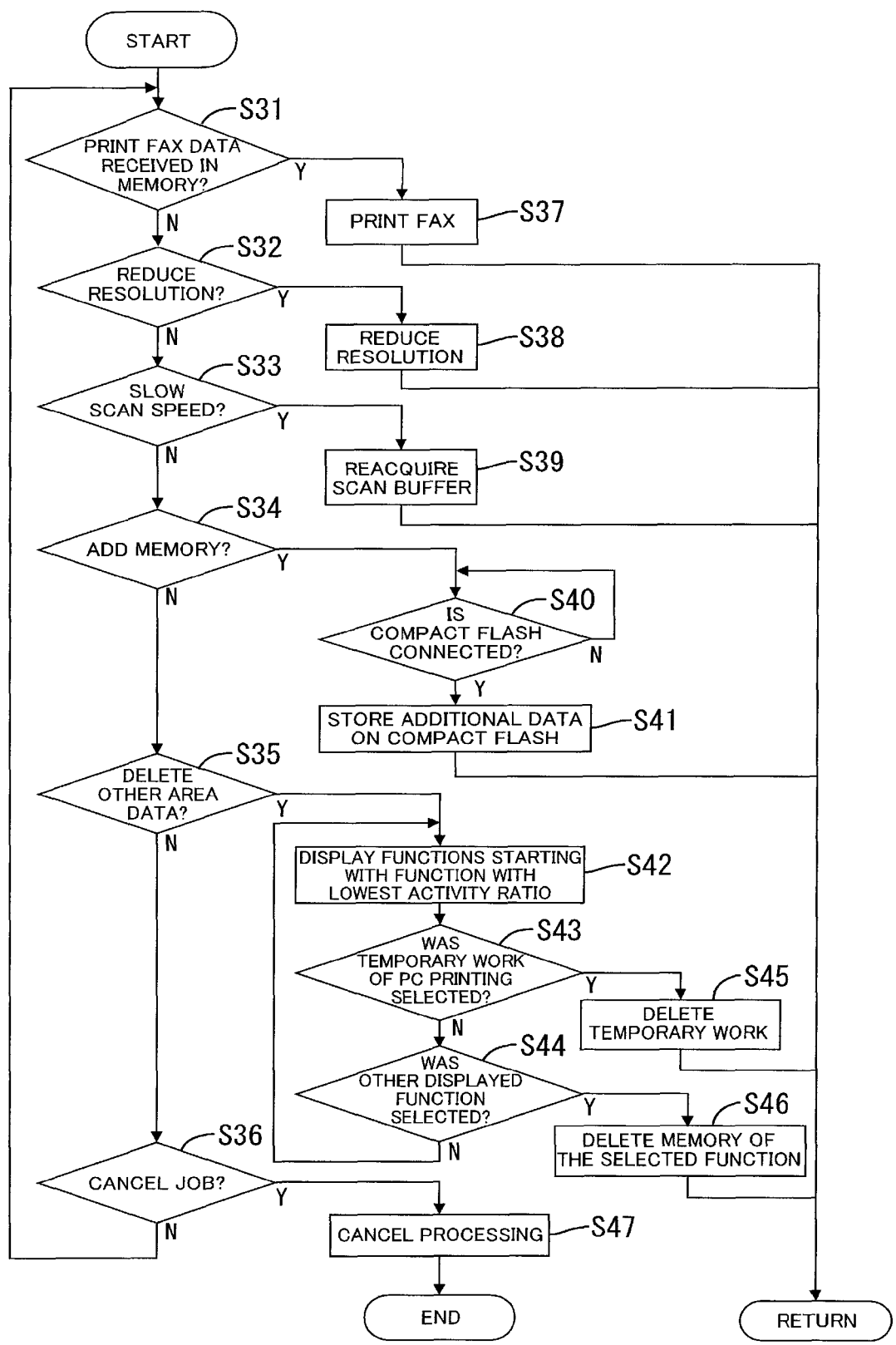
FIG. 9 is a flowchart illustrating a selection processing routine.

In the selection processing routine, as shown in FIG. 9, processing is carried out in order to execute a function that was selected by the user.

When the CPU 90 detects that an operation to switch the display was performed (i.e. the switch display button 72 shown in FIG. 6 was pressed) in a state in which the selection screen for the "print FAX data received in memory" display is displayed, the CPU 90 causes the touch panel 99 to switch the display each time the user performs an operation to switch the display, in the sequence of "print FAX data received in memory" (S31)→"reduce resolution" ("N" at S31)→"slow scan speed" ("N" at S32)→"add memory" ("N" at S33)→"delete data for other function" ("N" at S34)→"cancel job" ("N" at S35). Accordingly, the CPU 90 corresponds to "selection request output device that outputs a selection request relating to execution of one function" of this invention.

In this case, when the CPU 90 detects that an operation to switch the display was performed when "cancel job" is displayed ("N" at S36), "print FAX data received in memory" (S31) is displayed again and the above described selection display loop (S31 to S36) is repeated. Thereafter, when the CPU 90 detects that the user made a selection on any of the above described selection screens (detects that the set button 70 was pressed), the CPU 90 carries out processing in accordance with the relevant selection.

For example, upon detecting that "print FAX data received in memory" was selected ("Y" at S31), the CPU 90 outputs a signal to the image forming portion 22 or the like to cause it to print the FAX reception data on the condition that an error such as a paper shortage was cleared (S37).

Upon detecting that "reduce resolution" was selected ("Y" at S32), the CPU 90 lowers the scanning resolution of the scanner (S38) This corresponds to "not using an area reserved by another function in the shared area and lowering the performance of one function" according to the present invention. It is thereby possible to decrease the amount of data to be stored in the RAM 92.

Upon detecting that "slow scan speed" was selected ("Y" at S33), the CPU 90 causes the scan buffer to be reacquired in a state in which the scan speed was lowered (S39). This corresponds to "not using the area reserved by another function in the shared area and lowering the performance of the one function" according to this invention.).

Upon detecting that "add memory" was selected ("Y" at S34), the CPU 90 determines whether or not an external memory such as external memory member 81 is connected (S40), and when the CPU 90 determines that an external memory member 81 is connected ("Y" at S40), it stores (saves) the received data in the external memory member 81 or the like (S41) This corresponds to "external memory setting device" according to the present invention.

Upon detecting that "delete data for other function" was selected ("Y" at S35), the CPU 90 causes each function to be displayed in order on the touch panel 99 starting from the function with the lowest usage frequency (lowest activity ratio) (S42).

More specifically, when the function with the lowest usage frequency (lowest activity ratio) is PC print, for example, the print function is displayed first, and thereafter the other functions are displayed in the order of ascending activity ratios. Thus, since notification is performed in the order of ascending activity ratio of the RAM 92, the functions can be presented to the user in an order of priority that is in accordance with the actual usage situation. Alternatively, a configuration may also be adopted whereby the display order is determined in accordance with the usage frequency (activity ratio) of the data itself, such as a PC temporary file, and not the frequency of the PC print function.

Thereafter, when the CPU 90 detects, for example, that the print function was selected, it deletes the temporary file (S45). When another displayed function was selected, the CPU 90 deletes data relating to that other function (S46).

Upon receiving a cancel job signal ("Y" at S36), the CPU 90 cancels the job that is currently underway (S47) and ends the processing.

The CPU 90 then executes the current processing in accordance with the selected function, as shown in FIG. 8 (S23).

When the processing is completed ("Y" at S24), the CPU 90 stores the current count value n in the NVRAM 93 (S28) and ends the processing.

According to the present invention, when an area that the CPU 90 attempts to use for one function in the shared area of the RAM 92 (storage device) is an area that is reserved by another function, the CPU 90 can control the usage by the one function in accordance with a selection result that was entered on the operating part 6 (selection information input device) by the user. Accordingly, since it is possible to prevent overwriting or discarding or the like of data in the shared area against the user's intention and prevent processing delays caused by stopping execution of another function against the user's intention, utilization of the shared area and execution of multiple functions and the like can be carried out in accordance with the decision of the user.

Further, depending on the user, a case may be considered in which a user wishes to disable one function according to this invention. Therefore, in that case a setting can be made through the touch panel 99 (setting device) so that a selection request is not output from the selection request output device. It is thus possible not to control usage by one function of an area that is reserved by another function according to the present invention.

According to the present invention, even when an area to be used by one function cannot be reserved within the shared area of the RAM 92, an area to be used by the one function can be secured without overwriting or discarding information in the shared area by connecting an external memory such as an external memory member.

According to the present invention, the default operation for a user operation on the operating part 6 is associated with the function having the highest order of priority (activity ratio). It is therefore possible to reduce the number of instances in which the default operation with respect to a user operation on the operating part 6 is different to a desired operation. Thus, the number of instances in which a user is required to perform settings to carry out a desired operation can be reduced to enhance the usability.

The present invention is not limited to the various features provided in the foregoing description and drawings. For example, the following is also within the technical scope of the present invention.

Regarding the shared area of the RAM 92, a configuration may be adopted whereby the entire storage area of the RAM 92 is employed as a shared area that can store information for a plurality of functions, and the configuration is not limited thereto, and may be one in which only one part of the storage area of the RAM 92 is employed as a shared area that can store information for a plurality of functions.

The present invention is not limited to a configuration that reduces the resolution and, for example, a configuration may be adopted whereby the amount of data to be stored (area of memory to be used) is decreased by compressing the data.

I claim:

1. An image forming apparatus configured to selectively execute a plurality of functions, including a scanner function, involving image data processing, comprising:
   an image scanning portion configured to scan an image and thereby create image data;
   an image forming portion configured to form an image on a recording medium based on image data;
   a storage device having a shared area to be used by said plurality of functions for storing information including image data;
   a function control device configured to control selective execution of said plurality of functions by selecting one of said plurality of functions in response to an execution command, wherein said selected function executes using said shared area;
   a selection request output device configured to display at least one option, if free space on said shared area is insufficient for execution of said selected function, said selection request output device requesting an option chosen from said at least one option, wherein said at least one option comprises a data reduction option to reduce scanning resolution if the scanner function is selected as said selected function;
   a selection information input device configured to receive an input indicating said chosen option from said at least one option in response to the request from said selection request output device;
   a memory control device configured to control utilization of said shared area according to said chosen option; and
   a determination portion configured to determine whether a size of image data that is generated by the image scanning portion at a specific scanning resolution is greater than a size of the free space of the shared area, wherein:
      if the determination portion determines that the size of the image data is greater than the size of the free space, the selection request output device displays a data reduction option for making the image scanning portion execute scanning at a scanning resolution lower than the specific scanning resolution, and if the data reduction option is selected, the function control device controls the image scanning portion to execute scanning at the scanning resolution lower than the specific scanning resolution and generate image data, and the memory control device stores the image data that is generated at the low scanning resolution in the free space of the shared area.

2. An image forming apparatus as in claim 1, wherein said at least one option to be displayed comprises an option to cancel execution of said selected function.

3. An image forming apparatus as in claim 1, wherein:
   said at least one option comprises one of said data reduction option, a data deletion option and an additional memory option, said data deletion option being an option to allow deletion of information stored in said shared area and thereby increase free space on said shared area, said additional memory option being an option to add a memory to be used by said plurality of functions;
   said at least one option to be displayed includes at least two options selected from said data reduction option, said data deletion option and said additional memory option; and
   said at least two options are displayed one by one in a cyclically switchable manner.

4. An image forming apparatus having a plurality of functions involving image data processing, comprising:
   an image forming portion configured to form an image on a recording medium based on image data;
   a storage device having a shared area to be used by said plurality of functions for storing information including image data;
   a function control device configured to control selective execution of said plurality of functions by selecting one of said plurality of functions in response to an execution command and allowing said selected function to be executed using said shared area;

a selection request output device configured to display at least one option, if free space on said shared area is insufficient for execution of said selected function, said selection request output device requesting a choice from said at least one option;

a selection information input device configured to receive an input indicating an option chosen from said at least one option in response to the request from said selection request output device;

a memory control device configured to control utilization of said shared area according to said chosen option;

a facsimile interface configured to receive FAX data, wherein:

said plurality of functions include a facsimile reception function for receiving FAX data via said facsimile interface;

said at least one option comprises a data deletion option including an option to print FAX data, if the FAX data is currently stored in said shared area; and if the option to print FAX data is chosen as said chosen option, said function control device causes said image forming portion to print the FAX data that is stored in said shared area prior to execution of the chosen option, and thereafter said memory control device deletes the FAX data from said shared area and stores, in said free space of said shared area, image data that is generated by the execution of the chosen option.

5. An image forming apparatus as in claim 4, wherein said at least one option to be displayed comprises an option to cancel execution of said selected function.

6. An image forming apparatus as in claim 4, wherein:

said at least one option comprises one of said data deletion option, a data reduction option and an additional memory option, said data reduction option being an option to reduce an amount of storage space required for execution of said selected function and thereby enable execution of said selected function using the free space currently left on said shared area, said additional memory option being an option to add a memory to be used by said plurality of functions;

said at least one option to be displayed comprises at least two options selected from said data reduction option, said data deletion option and said additional memory option; and said at least two options are displayed one by one in a cyclically switchable manner.

7. An image forming apparatus having a plurality of functions involving image data processing, comprising:

an image forming portion configured to form an image on a recording medium based on image data;

a storage device having a shared area to be used by said plurality of functions for storing information including image data;

a function control device configured to control selective execution of said plurality of functions by selecting one of said plurality of functions in response to an execution command and allowing said selected function to be executed using said shared area;

a selection request output device configured to display at least one option, if free space on said shared area is insufficient for execution of said selected function, said selection request output device requesting a choice from said at least one option;

a selection information input device configured to receive an input indicating an option chosen from said at least one option in response to the request from said selection request output device;

a memory control device configured to control utilization of said shared area according to said chosen option and delete image data corresponding to the function of the chosen option; and a function activity ratio detection device configured to detect activity ratios of said plurality of functions, wherein:

said at least one option comprises a data deletion option including an option to selectively delete image data stored in said shared area;

said selection request output device displays at least one candidate for data deletion if the option to selectively delete image data is chosen as said chosen option; and if said at least one candidate comprises at least two candidates, said at least two candidates are displayed, sequentially one at a time, in ascending order of the activity ratios of functions associated with image data of said at least two candidates.

8. An image forming apparatus as in claim 7, wherein said at least one option to be displayed comprises an option to cancel execution of said selected function.

9. An image forming apparatus as in claim 7, wherein:

said at least one option comprises one of said data deletion option, a data reduction option and an additional memory option, said data reduction option being an option to reduce an amount of storage space required for execution of said selected function and thereby enable execution of said selected function using the free space currently left on said shared area, said additional memory option being an option to add a memory to be used by said plurality of functions;

said at least one option to be displayed comprises at least two options selected from said data reduction option, said data deletion option and said additional memory option; and said at least two options are displayed one by one in a cyclically switchable manner.

10. An image forming apparatus having a plurality of functions involving image data processing, comprising:

an image forming portion configured to form an image on a recording medium based on image data;

a storage device having a shared area to be used by said plurality of functions for storing information including image data;

a function control device configured to control selective execution of said plurality of functions by selecting one of said plurality of functions in response to an execution command and allowing said selected function to be executed using said shared area;

a selection request output device configured to display at least one option, if free space on said shared area is insufficient for execution of said selected function, said selection request output device requesting a choice from said at least one option;

a selection information input device configured to receive an input indicating an option chosen from said at least one option in response to the request from said selection request output device; and a memory control device configured to control utilization of said shared area according to said chosen option, wherein said at least one option comprises a data reduction option to reduce execution speed of said selected function, wherein if the data reduction option is selected, the function control device executes the selected function at the reduced execution speed, and wherein the memory control device provides a buffer in the free space of the shared area that is configured to temporally store image data in execution of the selected function, and if the data reduction option is selected, a size of the buffer is decreased.

11. An image forming apparatus as in claim 10, further comprising:

an image scanning portion configured to scan an image and create image data, wherein:

said plurality of functions include a copy function, which is executed using said image scanning portion and said image forming portion; and said data reduction option comprises a scanning speed option to reduce scanning speed, if the copy function is selected as said selected function.

12. An image forming apparatus as in claim 10, further wherein:

said at least one option comprises one of said data reduction option, a data deletion option and an additional memory option, said data deletion option being an option to allow deletion of information stored in said shared area and thereby increase free space on said shared area, said additional memory option being an option to add a memory to be used by said plurality of functions;

said at least one option to be displayed includes at least two options selected from said data reduction option, said data deletion option and said additional memory option; and said at least two options are displayed one by one in a cyclically switchable manner.

* * * * *